(12) United States Patent
Truong et al.

(10) Patent No.: US 8,462,193 B1
(45) Date of Patent: Jun. 11, 2013

(54) METHOD AND SYSTEM FOR PROCESSING AUDIO SIGNALS

(75) Inventors: Kwan Truong, Alpharetta, GA (US);
Peter Chu, Lexington, MA (US);
Michael Pocino, Marietta, GA (US);
John Allen, Dripping Springs, TX (US)

(73) Assignee: Polycom, Inc., San Jose, CA (US)

( * ) Notice: Subject to any disclaimer, the term of this patent is extended or adjusted under 35 U.S.C. 154(b) by 701 days.

(21) Appl. No.: 12/684,717

(22) Filed: Jan. 8, 2010

(51) Int. Cl.
*H04B 7/26* (2006.01)
*H04M 1/24* (2006.01)
*G10L 21/02* (2006.01)

(52) U.S. Cl.
USPC .......... 348/14.08; 62/296; 370/201; 370/286; 370/287; 370/292; 379/3; 379/88.07; 379/142.04; 379/202.01; 379/406.01; 381/66; 381/71.11; 381/71.4; 381/93; 381/94.1; 455/260; 455/445; 455/570; 704/226; 704/233; 704/243; 704/256.5

(58) Field of Classification Search
USPC ................. 62/296; 348/14.08; 370/201, 286, 370/292, 287; 379/142.04, 202.01, 387.01, 379/392, 406.01, 406.05, 406.08, 406.12, 379/406.14, 3, 88.07, 290; 381/66, 71.4, 381/71.11, 93, 94.1; 455/570, 260, 445; 704/233, 226, 243, 256.5
See application file for complete search history.

(56) References Cited

U.S. PATENT DOCUMENTS

| | | | | |
|---|---|---|---|---|
| 4,609,787 A * | 9/1986 | Horna | ....................... | 379/406.08 |
| 4,628,156 A * | 12/1986 | Irvin | ....................... | 379/406.07 |
| 4,747,132 A * | 5/1988 | Ibaraki et al. | ............ | 379/406.12 |
| 5,123,009 A * | 6/1992 | Winter | ......................... | 370/287 |
| 5,253,486 A * | 10/1993 | Sugahara et al. | ............... | 62/296 |
| 5,329,586 A * | 7/1994 | Agazzi | ..................... | 379/406.06 |
| 5,371,789 A * | 12/1994 | Hirano | ..................... | 379/406.08 |
| 5,400,394 A * | 3/1995 | Raman et al. | ............ | 379/88.07 |
| 5,404,397 A * | 4/1995 | Janse et al. | ............... | 379/202.01 |
| 5,600,714 A * | 2/1997 | Eppler et al. | ............ | 379/406.08 |
| 5,943,407 A * | 8/1999 | Davis et al. | ............... | 379/142.04 |
| 6,064,733 A * | 5/2000 | Hayashi | .................... | 379/406.06 |
| 6,138,022 A * | 10/2000 | Strawczynski et al. | ........ | 455/445 |
| 6,147,979 A * | 11/2000 | Michel et al. | ................. | 370/292 |
| 6,185,424 B1 * | 2/2001 | Pon et al. | ...................... | 455/445 |
| 6,192,126 B1 * | 2/2001 | Koski | ......................... | 379/406.14 |
| 6,546,099 B2 * | 4/2003 | Janse | ....................... | 379/406.01 |
| 6,597,787 B1 * | 7/2003 | Lindgren et al. | ......... | 379/406.05 |
| 6,606,595 B1 * | 8/2003 | Chengalvarayan et al. | ......................... | 704/256.5 |
| 6,640,094 B1 * | 10/2003 | Tabeta | ......................... | 455/260 |
| 7,085,245 B2 * | 8/2006 | Song et al. | .................... | 370/290 |
| 7,085,374 B2 * | 8/2006 | Schulz | ..................... | 379/406.01 |
| 7,177,416 B1 * | 2/2007 | Zhang et al. | ............ | 379/387.01 |
| 7,251,213 B2 * | 7/2007 | Chen et al. | ..................... | 370/201 |
| 7,298,711 B1 * | 11/2007 | Jarcy | ......................... | 370/286 |
| 7,318,030 B2 * | 1/2008 | Guduru | ......................... | 704/243 |
| 7,698,133 B2 * | 4/2010 | Ichikawa | ..................... | 704/226 |

(Continued)

*Primary Examiner* — Gerald Gauthier
(74) *Attorney, Agent, or Firm* — Wong, Cabello, Lutsch, Rutherford & Bruccuerli, LLP

(57) ABSTRACT

A multimedia conferencing system includes a loud speaker system, one or more microphones for receiving a local audio signal and a remote audio signal, a state machine and an echo canceller that operates in conjunction with two reference signals to remove substantially all of a feedback signal component in the local audio signal that results from reinforcing and playing the local audio signal over the loud speaker system. The state machine operates to detect that only the local audio is active, and if so controls the operation of the echo canceller such that only the feedback component of the local audio signal is removed and the local audio signal is not suppressed.

16 Claims, 5 Drawing Sheets

U.S. PATENT DOCUMENTS

| | | | |
|---|---|---|---|
| 7,764,783 B1 * | 7/2010 | Pai et al. | 379/406.08 |
| 7,787,597 B1 * | 8/2010 | Shlomot et al. | 379/3 |
| 7,903,828 B2 * | 3/2011 | Rodman | 381/71.11 |
| 7,948,862 B2 * | 5/2011 | Parnaby | 370/201 |
| 8,050,398 B1 * | 11/2011 | Xu | 379/392 |
| 8,103,011 B2 * | 1/2012 | Mohammad et al. | 381/66 |
| 8,155,302 B2 * | 4/2012 | Roovers | 379/406.05 |
| 8,170,227 B2 * | 5/2012 | Kano | 381/71.4 |
| 8,199,927 B1 * | 6/2012 | Raftery | 381/94.1 |
| 2002/0142811 A1 * | 10/2002 | Gupta et al. | 455/570 |
| 2003/0133565 A1 * | 7/2003 | Chang et al. | 379/406.01 |
| 2006/0188089 A1 * | 8/2006 | Diethorn et al. | 379/406.01 |
| 2007/0071230 A1 * | 3/2007 | Schulz | 379/406.06 |
| 2009/0089053 A1 * | 4/2009 | Wang et al. | 704/233 |
| 2011/0110532 A1 * | 5/2011 | Svendsen | 381/93 |

* cited by examiner

METHOD AND SYSTEM FOR PROCESSING AUDIO SIGNALS

FIELD OF THE INVENTION

The invention relates generally to processing audio signals generated during a multimedia conferencing session and specifically to the area of controlling the acoustic feedback associated with reinforced, local sound while improving the quality of an audio signal generated locally and sent to a remote location during a conferencing session.

BACKGROUND

The importance of canceling acoustic echo in audio signals generated by a full-duplex conferencing system is well known to audio communications engineers. Generally, acoustic echo results when a microphone and loudspeaker that are linked to the same conferencing system are proximate to each other. Loudspeaker output is received by a microphone and transmitted back to an individual speaking at a remote location who then hears their words a second time after the round trip delay. This acoustic echo can be very disruptive during the course of a conversation, as speakers at both a local and remote location may have to wait for the acoustic echo to subside before speaking again. To solve this problem, audio communication engineers have developed a variety of acoustic echo cancellation methods that have the effect of removing the acoustic echo component from the signal received by a microphone from a loudspeaker. Generally, acoustic echo cancellation (AEC) operates as follows: audio signals received from a remote location are framed to form a reference signal, this audio signal is then played by a loudspeaker, a microphone receives the acoustic echo from the loudspeaker and the resulting microphone signal is framed. The earlier generated reference signal is compared to the microphone signal and the two signals are summed at 180° out of phase and the resulting signal is transmitted back to the other end without any echo. Typically, it is very difficult to completely eliminate acoustic echo in an audio signal and so some back end processing to suppress the gain of the remaining echo in the return audio signal can be applied. As such, acoustic echo cancellation typically is composed of two separate processing steps. A first step linear echo cancellation step applies filters to filter out as much of the echo component in the signal as possible. But typically, echo cancellers are not able to completely eliminate the echo and so a second step applies the audio signal to some non-linear processing which "suppresses" or decreases the gain of the signal thereby suppressing the remaining remnants of the echo before sending an audio signal to the remote location.

A monophonic audio conferencing system suitable for use in a conference room typically employs one or more microphones and a single loudspeaker system to play audio received from a remote conferencing system. However; for larger rooms designed to accommodate many individuals each with their own microphone, it is usually advisable to employ a public address speaker system that both plays remote audio and amplifies or reinforces the local audio signals. With such an arrangement, all of the participants in the audio conference can be heard as they speak into their microphone by all of the other participants in the same room. One problem that arises when local sound reinforcement is employed in a conferencing system is that the reinforced audio is received by the microphones, creating a feedback loop and the potential for "howling". This problem can be resolved by simply turning the sound reinforcement gain down until the howling stops. Unfortunately, turning the sound reinforcement gain down can defeat the purpose of reinforcing the sound, resulting in the locally reinforced sound being to low to be easily heard by all of the participants in the room. Automatic feedback eliminator (AFB) methods have been employed to resolve this problem. Another problem associated with reinforcing local audio is that an audio conferencing system typically does not discriminate between local and remote audio signals. As the conferencing system is not able to discriminate between local or remote audio, it will run both types of audio signals through the same acoustic echo cancellation process. This is fine for the audio signals generated at a remote location, but AEC processing denigrates the quality of the local audio signal that is transmitted to a remote location and this processing also limits the local sound reinforcement gain that can be realized in the conferencing system.

Prior art solutions to this local sound reinforcement feedback problem have focused on utilizing notch filters with a singing detector that tracks and filters out the set of singing frequencies that cause the acoustic feedback problem. This approach can improve the gain of a local sound reinforcement system by as much as 6 dB. However, this solution typically injects comb filtering artifacts into the local audio signal which can be perceived as hollow and suppressed audio. Another solution to this problem is to employ an acoustic echo canceller to remove the feedback from the local audio signal. Unfortunately, this approach creates another problem; namely, acoustic echo cancellation attempts to eliminate the local audio signal which has the audible effect of clipping the local audio signal which compromises both the reproduction of the local audio at the far end of a conference and the reproduction of the reinforced local audio at the near end. Nothing in the prior art teaches how to process a local audio signal, in the presence of sound reinforcement, such that the quality of the local audio signal is maintained and the gain of the sound reinforcement system is maximized.

SUMMARY

Therefore, it would be desirable if an audio conferencing system processed remotely generated audio signals such that substantially all of the audible echo is cancelled and to process audio signals generated locally in such a manner that the signal quality as transmitted to a remote location is maintained and such that the reinforced local audio signal is not unnecessarily gain limited. Subsequently, the ideal operating condition for an audio conferencing system with reinforced local audio is to transmit audio signals generated locally to a remote location with little or no audio signal degradation, while at the same time preserving the conferencing systems ability to reinforce the local audio to a comfortable listening level, or as loud as possible, without any howling or acoustical feedback.

In one embodiment, a local conferencing system with reinforced local audio employs a first and second echo canceller reference in conjunction with an echo canceller to process a local audio signal so as to remove substantially all of a feedback component but to not suppress the local audio signal in the event that it detects that only the first echo canceller reference is active.

In another embodiment, a local conferencing system with reinforced local audio employs a first conferencing system reference in conjunction with a feedback canceller and a second conferencing system reference in conjunction with an echo canceller to process a local audio signal so as to remove substantially all of a feedback component but to not suppress the local audio signal in the event that it detects that only the first conferencing system reference is active.

DETAILED DESCRIPTION

Multimedia conferencing systems are in use that are capable of conducting sessions that include some combination of the transmission and reception of video, audio and textual information between two or more end points. Although the invention described here can be implemented in a multimedia conferencing system, for the purpose of this description, an audio only conferencing system will be described. Also, although the invention will be described in the context of two embodiments, a first embodiment in which a loud speaker system includes a single set of loudspeakers to play both reinforced local audio and remote audio and a second embodiment in which a loud speaker system includes two sets of speakers where one set only plays reinforced local sound and the second set plays only remote audio. Although the invention is described in the context of one or two sets of speakers, more than two sets of speakers can be used to play audio. So, for instance, in the event that two or more remote locations are generating audio signals that are received by a local conferencing system, it may be desirable to play the audio signals from each of the remote locations in a separate set of loudspeakers. The combinations of local and remote audio played in various sets of speakers largely depends upon the context of the audio conference and sound field that is needed for the participants to easily understand who is talking at any particular time during the conference. And these combinations of speakers to audio signals are only limited by the number of separate audio channels that the conferencing system is able to process.

Figure 1:
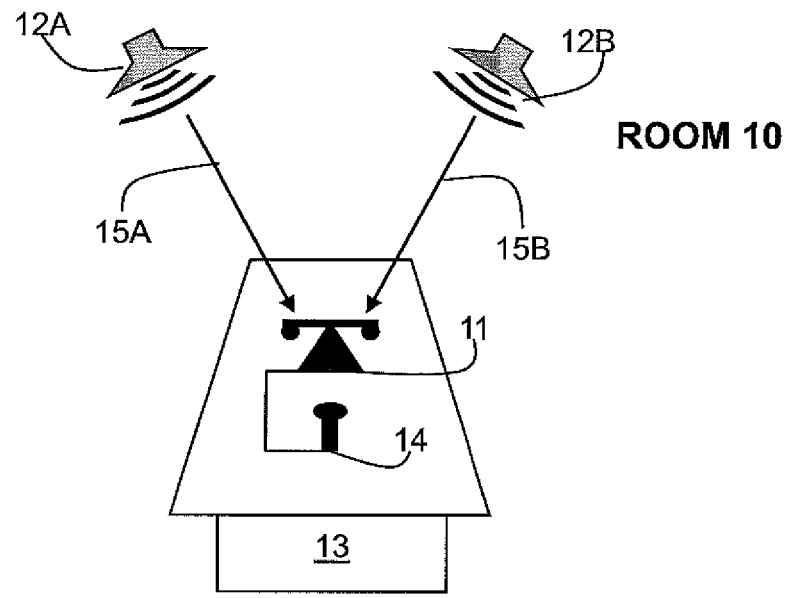
FIG. 1 is an illustration of a conference room with a single set of loudspeakers.

FIG. 1 shows a conference room 10 that includes a local audio conferencing system 11, referred to subsequently as simply the conferencing system, that is positioned on a table 13, or some other article of furniture in the room, at least one microphone 14 that is either wired to or in wireless communication with the conferencing system 11, and a set 12 of two loudspeakers 12A and 12B that are either wired to or in wireless communication with the conferencing system 11. There can be more than two loud speakers in the room, but for the purpose of this description, we will only show two. The conferencing system receives audio signals from at least one other conferencing system, not shown, that is positioned in some remote location outside of the conference room 10 and connected over a suitable communications network, also not shown, to the local conferencing system 11. The arrowed lines labeled 15A and 15B that start at the output of each loudspeaker 12A and 12B respectively and continue to the microphone 14 represent a single echo path 15 or audible audio signal propagation path. This echo path may include only a remote audio signal, only a local audio signal or both a remote and a local audio signal at the same time. The importance of this echo path will be described later in more detail with respect to FIGS. 3 and 4.

Continuing to refer to FIG. 1, the conferencing system 11 generally operates to receive audio signals that are generated at a remote location (remote audio) over a network, process these signals to cancel acoustic echo and to play these signals over each one of the two loudspeakers 12A and 12B. Also, the conferencing system 11 can operate to receive a local audio signal, to reinforce this local audio and play the reinforced local audio signal on the set of speakers 12. The locally generated audio signal is typically reinforced when the conferencing system is located in a very large meeting room or chamber, such as many large corporations or governmental bodies maintain in order to provide a virtual meeting place for large numbers of employees located remotely from one another. When local sound reinforcement is employed, it is critical that the conferencing system is able to reproduce or play the locally generated audio signals such that they can be easily heard by all those participating in the meeting who are positioned in a local conference room, such as conference room 10. According to an embodiment of the invention, and as will be described in more detail with reference to FIG. 3, the conferencing system 11 is able to detect when only a local audio signal is active, which causes the system 11 to react by processing the local audio signal in a manner which substantially cancels the acoustic feedback component of the local audio signal but does not suppress the local audio signal. The effect of the invention is to not unnecessarily limit the gain (Gain can be increased by as much as 20 dB) of the reinforced local audio and, at the same time, improve the quality (polyphonic in sound) of the local audio signal as heard when played at a remote location.

Figure 2:
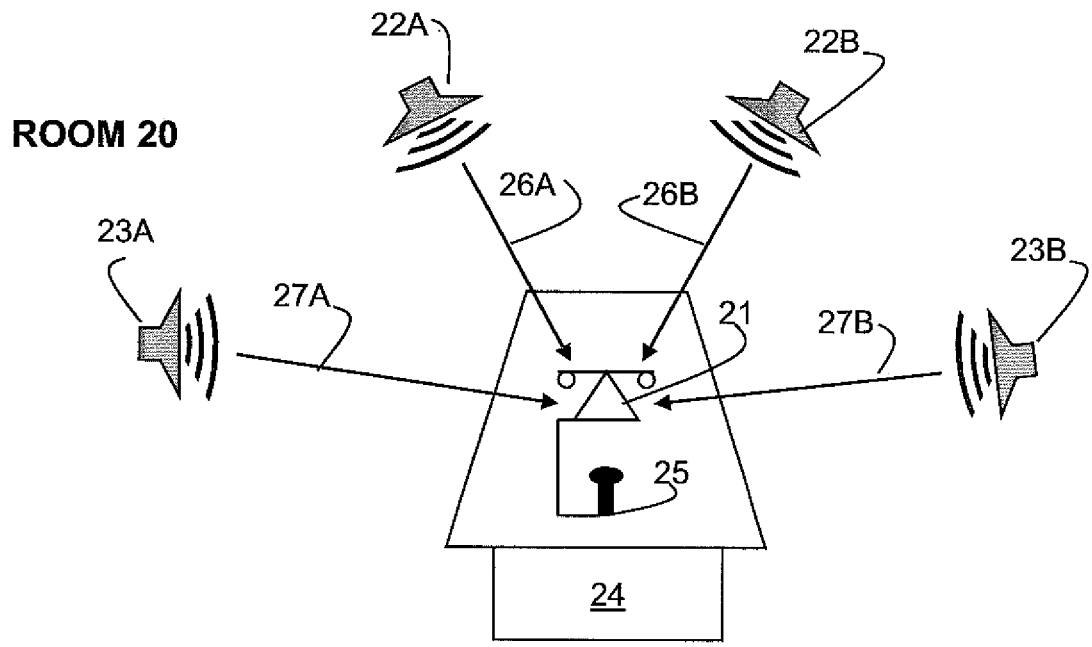
FIG. 2 is an illustration of a conference room with two sets of loudspeakers.

FIG. 2 shows a conference room 20 that includes a local audio conferencing system 21, referred to subsequently as simply the conferencing system 21, that is positioned on a table 24, or some other article of furniture in the room, at least one microphone 25 that is either wired to or in wireless communication with the conferencing system 21, and a first set and a second set of loudspeakers, 22 and 23 respectively, that are either wired to or in wireless communication with the conferencing system 11. There can be more than two sets of loudspeakers in the room, but for the purpose of this description, we will only show two. The conferencing system receives audio signals from at least one other conferencing system, not shown, that is positioned in some remote location outside of the conference room 20 and connected over a suitable communications network, also not shown, to the local conferencing system 21. The two sets of arrowed lines labeled 26A and 26B and 27A and 27B that start at the output of each loudspeaker 22A and 22B and 23A and 23B respectively and continue to the microphone 25 represent two echo paths 23 and 23 or audible audio signal propagation paths, each of which contains different audio signals. In this case, the speaker set 22 is designated to only play remote audio and speaker set 23 is designated to only play reinforced local audio sound. The importance of these echo paths will be described later in more detail with respect to FIG. 4.

Continuing to refer to FIG. 2, the conferencing system 21 generally operates to receive remote audio signals over a network, process these signals to cancel acoustic echo and to play these signals over one of the two sets of loudspeakers, which in this case can be set 22. Also, the conferencing system 21 can operate to play a reinforced, local audio signal on one of the sets of speakers, which can be set 23 for instance. As mentioned previously, when local sound reinforcement is employed, it is critical that the conferencing system is able to reproduce or play the locally generated audio signals such that they can be easily heard by all those participating in the meeting who are positioned in a local conference room, such as conference room 20. According to an embodiment of the invention, the conferencing system 21 is able to detect when only a local audio signal is active which results in the system 21 processing the local audio signal in a manner which substantially cancels the acoustic feedback component of the local audio signal but does not suppress the local audio signal itself. The is to not unnecessarily limit the gain (increased by as much as 20 dB) of the local sound reinforcement and, at the same time, improve the quality of the local audio signal (more polyphonic components) as heard when played at a remote location.

Figure 3A:
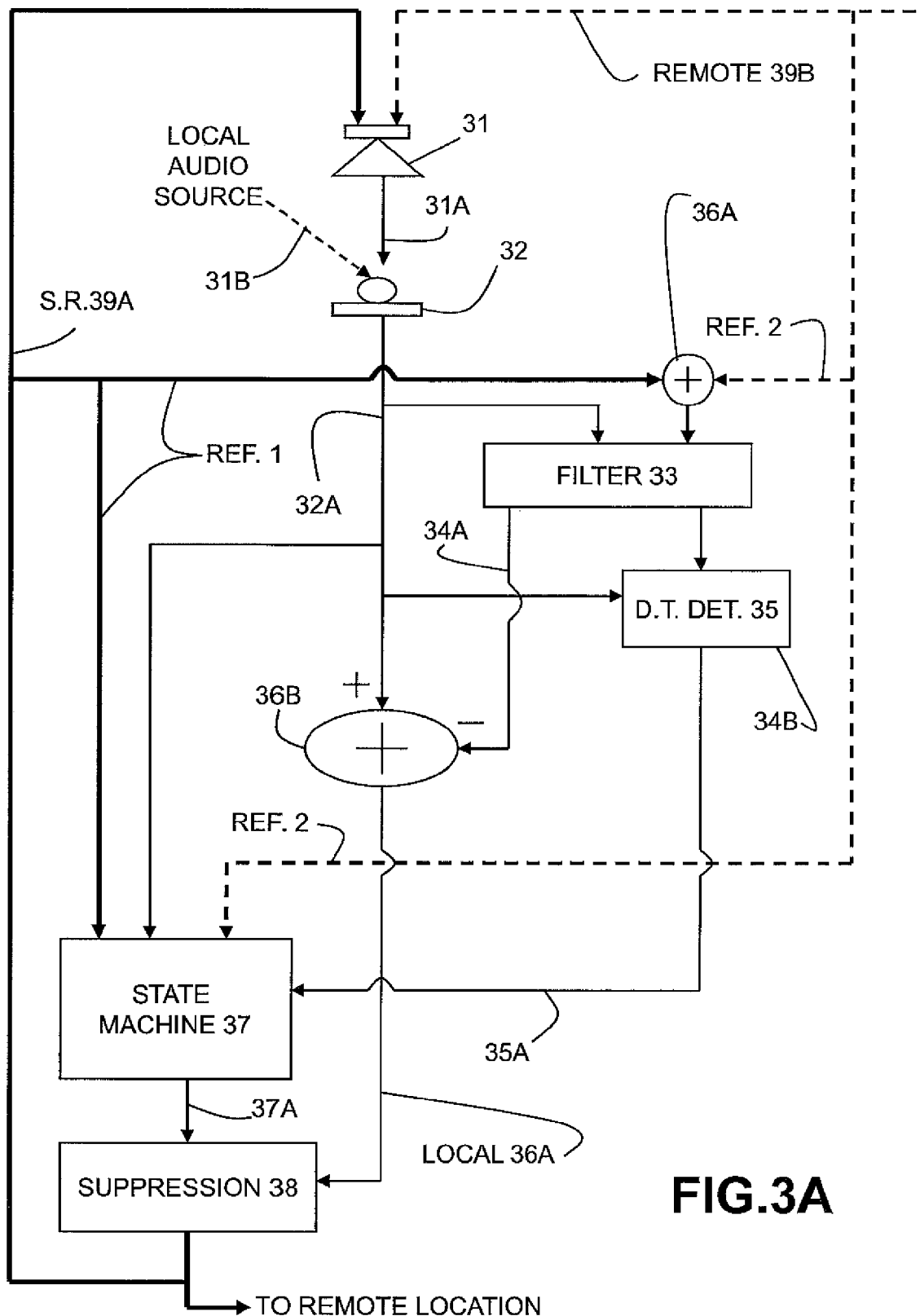
FIG. 3A is a diagram showing the functional blocks necessary to implement an embodiment of the invention with a single set of loud speakers.

FIG. 3A is a block diagram of the conferencing system 11 of FIG. 1 showing the functional elements necessary to implement an embodiment of the invention where both the local and remote audio are played over the same set of loud speakers. The conferencing system 11 is comprised of a set of loud speakers 31, one or more microphones 32, one adaptive filter 33, a double-talk detector 35, summation functionality 36A and 36B, a state machine 37 and signal suppression functionality 38. The loud speakers 31 can receive and play both a remote audio signal 39B and a sound reinforced local signal (S.R.) 39A. An acoustic signal 31A generated by the loud speakers 31 can be either the SR signal 39A, or echo as the result of playing the remote audio signal 39B or the combination of both SR and echo if the remote and local audio are both active at the same time. Also, a local audio source, which can be a person speaking for instance, can generate an acoustic signal 31B that is received by the microphone 32.

Continuing to refer to FIG. 3A, when the system 11 is in transmit mode, the microphone 32 in conferencing system 11 receives an acoustic audio signal generated by the local source, converts this local acoustic, audio signal to a local audio signal 32A and propagates this local audio signal 32A to adaptive filter 33, to the summation function 36B, to the double talk detector 35 and to the state machine 37. The local audio signal 32A sent to adaptive filter 33A is used by the filter, in conjunction with REF.1 to train the filter to calculate an estimate of the acoustic feedback received by the microphone 32 as the result of playing the S.R. audio signal 39A over the loud speaker system 31. Due to processing delay in the conferencing system 11, this acoustic feedback is delayed after the local audio 31B is generated. The delay may be approximately 10 msec to about 25 msec after the local audio 31B is generated. The feedback estimate 34A calculated by filter 33 is sent to both the summation function 36B and to the double talk detector 35. The feedback estimate 34A is employed by the summation function 36B to substantially cancel all of the feedback, which in this case is the SR signal 39A played by the loudspeakers 31 and received at the microphone and propagated in the system 11. Canceling substantially all of the feedback in the context of this application means that although the adaptive filter 33 can be designed to cancel almost all of the feedback, some feedback may still remain in the local audio signal. As previously mentioned, a local audio signal is actually composed of some number of sequential frames of audio information. As the first "X" number of frames of audio information do not include any feedback component, these initial "X" number of audio frames are propagated through the feedback canceller unfiltered. At the point that the audio frames include a feedback component, typically about 10 msec to about 25 msec after the local audio becomes active, the feedback canceller will start to remove the feedback signal component from the local audio frames. For the purpose of this description, at least one, initial audio frame can propagate through the conferencing system 11 before feedback is injected into the local audio signal and the feedback canceller starts removing this feedback. A second and subsequent sequential audio frame can include a local audio signal component and an acoustic feedback signal component, and it is this feedback component that the feedback canceller removes from the local audio signal.

Continuing to refer to FIG. 3A, the filter 33 and the summation function 36B operate together to perform feedback cancellation and can be thought of as a "feedback canceller". Although the local audio is referred to here as a "signal", this signal is actually a sequence of "N" frames of acoustic, audio information. The functionality employed to sample an acoustic, audio signal is not shown in FIG. 3A, but the design and operation of such functionality is well know to audio engineers. An acoustic, audio signal can be sampled at various rates depending upon many factors, for example 32 kHz, 48 kHz, etc.

Continuing to refer to FIG. 3A, when the system 11 is in receive mode, a remote audio signal 39B is received by the conferencing system 11 and is propagated to the loud speakers 31 to be played, propagated to filter 33, as REF. 2, and to the state machine 37. The filter 33 uses the REF.2 and acoustic echo received by the microphone 32 and propagated by system 11 to the filter 33 to calculate an estimate 34 of the acoustic echo. This acoustic echo results when the remote audio signal 39B is played over the loud speakers 31 and received by the microphone 32. This estimate 34 is then sent to the double talk detector 35 and to the summation function 36B. The summation function 36B uses the estimate 34 to remove substantially all of the acoustic echo from the remote audio so that it is not transmitted back to the remote location and played. Canceling substantially all of the echo in the context of this application means that although adaptive filter 33 can be designed to cancel almost all of the echo, some echo may still remain in the local audio signal. The filter 33, the summation function 36B, the state machine 37 and the suppression functionality 38 operate together to perform echo cancellation and echo suppression and can be thought of together as an "echo canceller". Any acoustic echo that remains in the remote audio signal is removed by the suppression functionality 38 which operates to apply non-linear processing to the remote audio signal.

Continuing to refer to FIG. 3A, when both the local audio and the remote audio are active at the same time, both REF.1 and REF.2 are active and the system 11 propagates both references to filter 33. In this case, the audio signal generated by the microphone includes both an acoustic echo and an acoustic feedback component. This signal is propagated to the summation function 36 where the estimate 34 generated by filter 33 is used by the function 36B to remove substantially all of the echo and the feedback from the audio signal which is then passed to the suppression functionality 38. The state machine 37 in FIG. 3A, is controlled by the two reference signals, REF.1 and REF.2, and by the output of the double talk detector 35. The design and operation of double talk detectors are well understood by those skilled in the area of audio and video conference system design and so will not be described here in any detail. However, the double talk detector 35 in FIG. 3A generally operates to detect the presence of both a local audio signal and acoustic echo in the system 11 at the same time. The double talk detector 35 receives the outputs of filter 33, which is an estimate of the acoustical feedback and echo, and it also receives any signals that are propagating on signal line 32A at its input. As describe above, the output of the double talk detector 35A is sent to the state machine 37. When the double talk detector 35 output signal 35A is true, this is an indication that both the local audio and the remote audio are active at the same time. Generally, the state machine 37 operates to detect the presence or absence of the two reference signals, REF. 1 and REF. 2, and the output of the state machine 37 is a control signal 37A that when true controls the operation of the suppression function 38 such that it does not suppress local audio. The operation of the state machine 37 will be described in detail later with reference to FIG. 4.

The suppression function 38 of FIG. 3A operates under the control of the state machine 37, and according to an embodiment, to suppress or to not suppress an audio signal that is transmitted to the remote site and that is also sent to the loud speakers 31 as SR audio 39A. The operation of the state machine 37 will be described in detail later with reference to the description of FIG. 4. In the event that the system 11 is in the double talk state, the suppression function 38 will operate to suppress both the local audio signal and the SR signal 39A. On the other hand, in the event that the system 11 is in transmit state, and according to an embodiment, the suppression function 38 will not operate so as to suppress either the local audio transmitted to a remote site or the SR audio 39A propagated to the loud speakers 31. Typically, in a prior art audio or video conferencing system that includes local SR, the SR signal played by a loudspeaker system will be detected by the system as remote audio and so the conferencing system will apply both echo cancellation and echo suppression to the local audio signal. This has the unfortunate effect of limiting the level at which the SR signal can be played by the sound reinforcement system [to avoid howling] and also denigrates the quality of the local audio signal as perceived by listeners at a remote location. The permits in increase of approximately 20 dB in gain over the normal local audio signal level. This additional gain permits the SR system to play the local audio signal at levels that can be heard by all participants in large conference rooms without the effect of howling. It should be understood that, although the invention is described in the context of a single loudspeaker system 31 receiving and playing both SR audio and remote audio, the method also operates if there are two separate loudspeaker systems, each playing different audio signals. So for instance, one set of loud speakers can receive and play SR audio and another set of loudspeakers can receive and play remote audio. The invention is not limited to the number of sets of loudspeakers that are employed to play different audio signals. One advantage is the ability of the system 11 to recognize that only local audio is active and to operate so as to not suppress this local audio signal.

Although, assigning one reference, REF. 2, to the remote audio and another reference, REF. 1 to the local audio does remove feedback from the SR audio signal, the local audio signal transmitted to the remote end is perceived by a listener at the remote end as being somewhat "processed" or suppressed and the SR audio gain is not maximized. This is due to the system 11 coming to the determination that it is in the double talk state, even when only local audio is active due to the SR audio being played by the loudspeakers. In this state, the suppression functionality is active and applying non-linear processing to the local audio signal (suppressing it). In a further aspect, and as described previously with reference to FIG. 3A, a state machine 37 is implemented in system 11 that receives as input both references, REF.1 and REF.2, and the output of the double talk detector 35. The state machine 37 is designed to control the operation of the suppression functionality 38 such that when it recognizes only REF. 1 (this is sound reinforced local audio 39A) to be active, it generates and sends a signal to the suppression functionality 38 causing this functionality to not suppress the local audio signal. As a result of the operation of the state machine 37 controlling the suppression functionality 38 in this manner, the gain of the SR audio 39A can be maximized for play over the loudspeaker system and the quality of the local audio signal transmitted to a remote location is preserved.

Figure 3B:
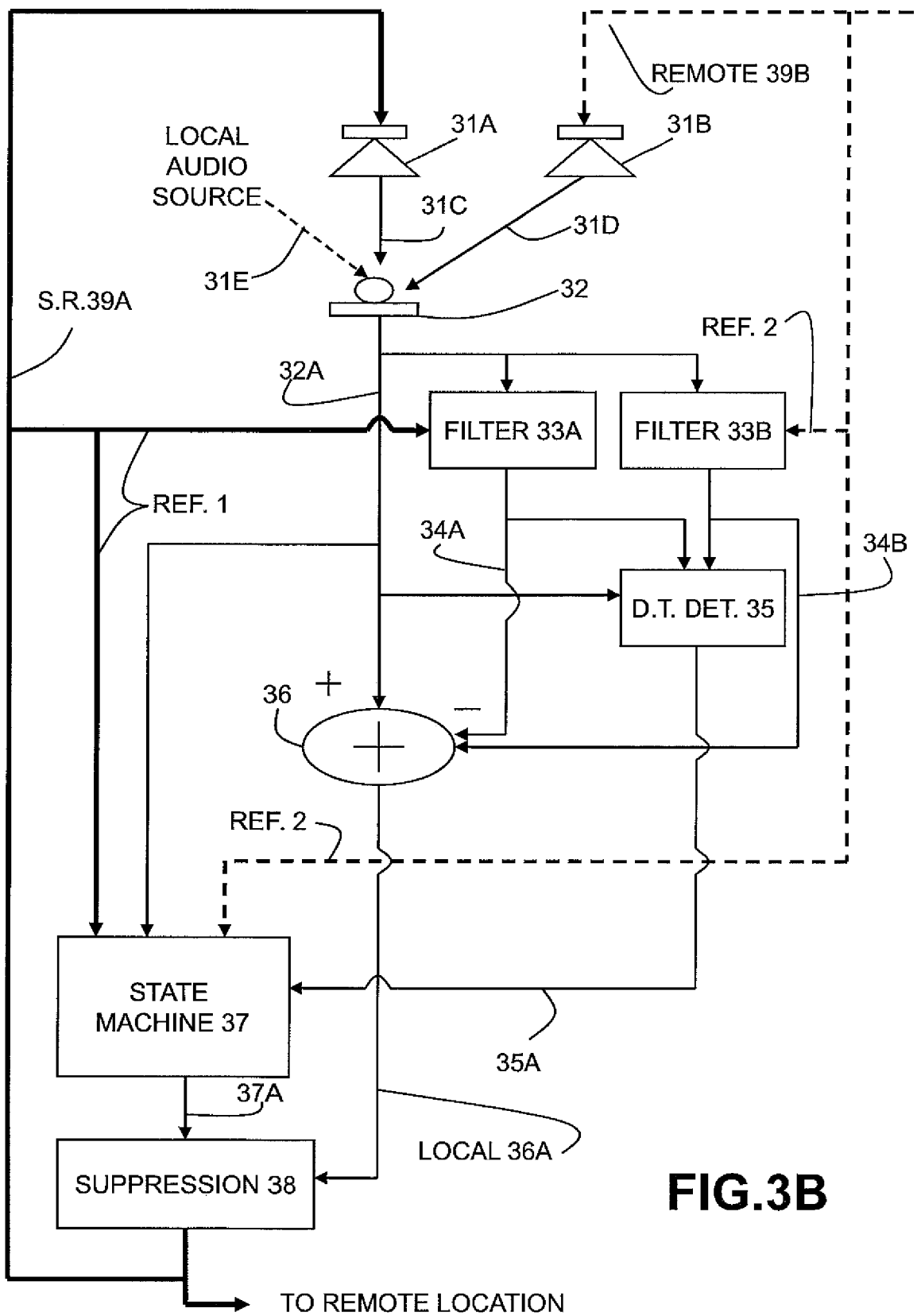
FIG. 3B is a diagram showing the functional blocks necessary to implement an embodiment of the invention with two sets of loud speakers.

FIG. 3B is a block diagram of the conferencing system 11 of FIG. 1 showing the functional elements in which the local and remote audio are played over a loud speaker system that is comprised of two separate sets of loud speakers 31A and 31B respectively. In addition to the two sets of loud speakers 31A and 31B, the conferencing system 11 is comprised of one or more microphones 32, two adaptive filters 33A and 33B, a double-talk detector 35, summation functionality 36, a state machine 37 and signal suppression functionality 38. As mentioned above, the loud speaker set 31A plays sound reinforced local audio and loud speaker set 31B plays remote audio 39B. An acoustic signal 31C represents acoustic feedback generated by the loud speakers 31A as the result of playing sound reinforced local audio and an acoustic signal 31D represents acoustic echo generated by the loud speakers 31B as the result of playing remote audio 39B. Also, a local audio source, which can be a person speaking for instance, can generate an acoustic signal 31E that is received by the microphone 32.

Continuing to refer to FIG. 3B, with the exception of the two filters 33A and 33B, the operation of the system 11 supporting two sets of loud speakers is largely the same as with one set of loud speakers, as was described earlier with reference to FIG. 3A. Both filters 33A and 33B can receive acoustical feedback and/or a remote audio signal from the microphone 32. The acoustical feedback signal and the remote audio signal are represented in FIG. 3B as audio signal 32A. Filter 33A receives a reference signal, REF.1, that is the reinforced local audio signal S.R.39A and operates in conjunction with the acoustical feedback signal to calculate an estimate of the acoustical feedback component in the local audio signal. Filter 33B receives a reference signal, REF.2, that is the remote audio signal 39B and operates in conjunction with the acoustical echo signal to calculate an estimate of the acoustical echo to be removed from the audio signal passed to the summation function 36. For the purpose of this description, the two filters 33A and 33B, the summation function 36, the state machine 37 and the suppression functionality 38 are consider to be an "echo canceller".

Figure 4:
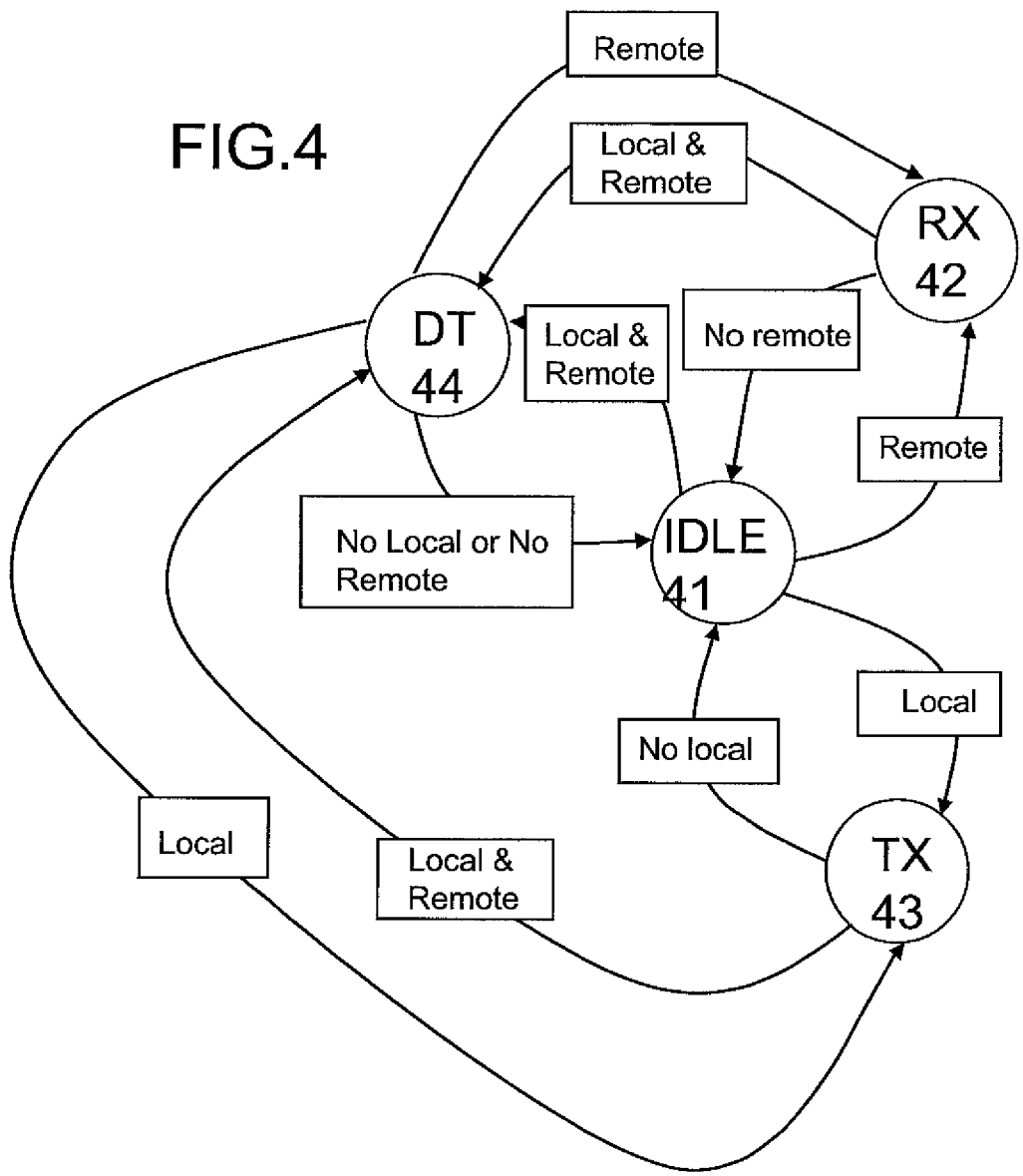
FIG. 4 is a diagram showing the operation of a state machine associated with the first embodiment of the invention.

The operation of state machine 37 will now be described with reference to FIG. 4 in the context of a system 11 that supports a single set of loud speakers. State machine 37 is comprised of four system 11 states; namely, an idle state 41 in which neither the local or remote audio is active, a receive state (RX) 42 in which only the remote audio is active, a transmit state (TX) 43 in which only the local audio is active and a double talk state (DT) 44 in which both local and remote audio are active at the same time. The state machine 37 transitions from the idle state 41 to the RX state 42 when only the remote audio is active as indicated by the REF.2 input, as shown in FIG. 3A, to the state machine being active. When in the RX state 42, the system 11 employs the adaptive filter 33 and the suppression functionality 38 to apply both echo cancellation and echo suppression to an echo signal received at the microphone 32 as the result of the loudspeakers 31 playing a remote audio signal 39B. The state machine 37 transitions from the idle state 41 to the TX state 43 when only REF.1 input, as shown in FIG. 3A, to the state machine 37 is active. When in the TX state 43, the system 11 employs the adaptive filter 33 to remove the feedback from the SR audio signal. However, in the TX state, the state machine 37 generates a signal 37A that is sent to the suppression functionality 38 in FIG. 3 that controls the suppression functionality 38 so as to not apply non-linear processing to the feedback removed, local audio signal. The state machine 37 transitions from the idle state 43 to the DT state 44 when both the REF.1 and REF.2 and the DT detector 35 inputs to the state machine are active. In the DT state 44, the system 11 employs filter 33 to respectively remove acoustic feedback and echo from the signal received by the microphone 32. As shown in FIG. 4, the state machine 37 can transition from any state to any other state, but this operation is not important to an understanding of the invention and so will not be described here.

Figure 5:
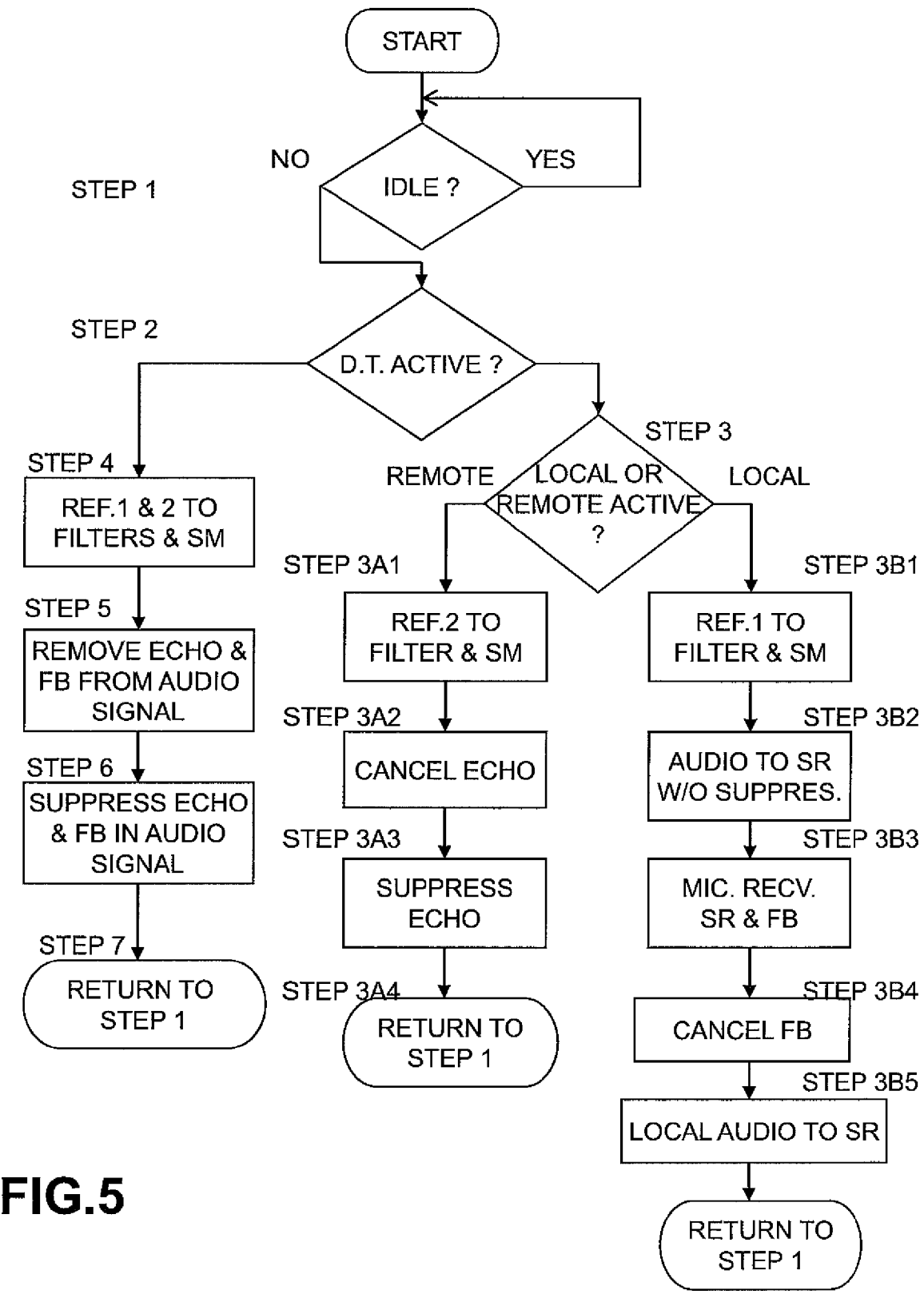
FIG. 5 is a logical flow diagram showing the method employed to practice one embodiment of the invention.

FIG. 5 is a logical flow diagram illustrating the audio signal processing method. This diagram will be described in the context of a conferencing system, such as system 11, that operates with a single set of loud speakers with each of the loud speakers in the system playing both a remote audio signal and a sound reinforced local audio signal. But it should be understood that the invention can also be easily implemented in a conferencing system that incorporates two or more separate speaker systems each system playing different audio signals. In step 1 of the process, the state machine 37 described with reference to FIG. 4 includes logic that determines the state of the conferencing system 11. If the system 11 is in the IDLE state, then it just loops on step 1. If, in step 2 the system 11 detects audio signal activity at its inputs [typically reference signal activity] then the state machine 37 examines its inputs, and if both REF.1 and REF.2 are active, determines that it is in the D.T. state and the process proceeds to step 4. On the other hand, if the state machine 37 determines in step 2 that it is not in the D.T. state then the process proceeds to step 3. In step 3, the state machine 37 determines which of either the remote or local audio is active. In the event that the local audio is active, the process proceeds to step 3B1, otherwise the process proceeds to step 3A1. Following the path associated with the active local audio, 3B, in step 3B1 the filter 33 and the state machine 37 receive the REF.1 signal and in step 3B2 the local audio signal is propagated through the summation function 36 unchanged and to the suppression functionality 38 without any suppression. The local audio signal is not suppressed at this point because the state machine 37 does not detect any remote audio [in this case, the acoustic feedback] and so disables the suppression functionality and because there is no feedback component to this signal [also because filter can't react to ref this quickly]. In step 3B3 the S.R. signal generated by system 11 is played by the loudspeaker system 31 and received by the microphone 32 as acoustic feedback. Local audio may still be active at this point and so the microphone 32 may also receive a local audio signal at substantially the same time as it receives the acoustic feedback. At substantially the same time in this context means that the acoustic feedback and the local audio are at least both active during the same time period, except that at the beginning of the time period the local audio is active approximately 10 msec prior to the system 11 receiving the related acoustic feedback and at the end of the time period the local audio is inactive approximately 10 msesc before the associated acoustic feedback is received by the system 11. In step 3B4, the feedback canceling portion of the system 11, [this is the filter 33A and summation function 36] employs the REF.1 signal received earlier in step 3B1 to remove the feedback from the local audio signal and passes the feedback removed local audio to the suppression function 38. The state machine 37 detecting that only local audio is active disables the suppression function 38 and in step 3B5 the feedback removed local audio signal is propagated as SR local audio 39A to the speakers 31. At this point, the process returns to step 1 and continues to loop until the local audio becomes inactive.

Continuing to refer to FIG. 5, in the event that the state machine 37 determines in step 3 that only the remote audio is active, the process proceeds to step 3A1 where the filter 33B and the state machine 37 receive the REF.2 signal and the remote audio signal is played by the loudspeaker system 31. The microphone 32 receives the acoustic echo, and in step 3A2 the summation function 36 uses the echo estimate that it receives from the filter 33B to cancel some or all of the echo. What is left of the echo signal is propagated to the suppression functionality 38 where any remaining echo is suppressed. At this point the process returns to step 1 and continues to loop until the remote audio is inactive.

Continuing to refer to FIG. 5 and returning to step 2, in the event that the D.T. detector determines that both local and remote audio are active at the same time, the process goes to step 4 where both the state machine 37 and the filter 33 receive reference signals, REF. 1 and REF. 2 respectively. In step 5, the filter 33 and the summation function 36 operate to remove the echo and any feedback component in the local audio signal and pass the feedback removed, local audio signal to the suppression functionality 38. In this case, because the system 11 is in DT state, the SM 37 causes the suppression functionality 38 to suppress the local audio signal before it is propagated to as SR audio to the loudspeaker system 31. In step 7, the process returns to step 1 and loops until the system 11 exits the DT state.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

We claim:

1. A method of processing a local audio signal in a conferencing system, comprising:
   assigning a reinforced local audio signal as a first reference;
   assigning a remote audio signal as a second reference;
   receiving a first frame of the local audio signal;
   transmitting the first frame of the local audio signal to a remote conferencing system;
   reinforcing the first frame of the local audio and propagating the reinforced first local audio frame to a loud speaker system;
   at an echo canceller, receiving the first reference and a second frame of the local audio signal, the second frame of the local audio signal containing acoustical feedback;
   removing substantially all of the acoustical feedback from the second frame; and as a result of determining that only the first reference is active, not suppressing the second frame of the local audio signal.

2. The method of claim 1 further comprising transmitting the second frame of the local audio signal to both the local loud speaker system and to the remote conferencing system.

3. The method of claim 1 wherein the conferencing system is one of a multimedia conferencing system, an audio conferencing system and a video conferencing system.

4. The method of claim 1 wherein the echo canceller comprises an adaptive filter, a summation function, a state machine and suppression functionality.

5. The method of claim 1 wherein local audio signals are received at one or more microphones connected to the conferencing system and are sent to at least one loudspeaker connect to the conferencing system.

6. The method of claim 1 wherein the local loud speaker system comprises a plurality of loud speakers, each loudspeaker being capable of playing both a remote and local audio signals.

7. In a local conferencing system including reinforced local audio, a method for processing a local audio signal comprising:
assigning a first conferencing system reference as a feedback canceller reference for calculating an estimate of acoustical feedback;
assigning a second conferencing system reference as a echo canceller reference for calculating an estimate of acoustical echo for an echo canceller;
receiving a first frame of a local audio signal,
transmitting the first local audio signal frame to a remote conferencing system;
reinforcing the first frame of the local audio and propagating the reinforced first local audio signal frame to a local loud speaker system;
detecting that only the feedback canceller reference is active;
receiving at substantially the same time both an acoustical feedback signal and a second frame of the local audio signal and employing a feedback canceller to remove substantially all of the acoustical feedback from the second frame of the local audio signal; and
as the result of detecting that only the feedback canceller reference is active, not suppressing the second frame of the local audio signal.

8. The method of claim 7 further comprising transmitting the second frame of the local audio signal to both the local speaker system and to the remote conferencing system.

9. The method of claim 7 wherein the conferencing system is one of a multimedia conferencing system, an audio conferencing system and a video conferencing system.

10. The method of claim 7 wherein the first conferencing system reference is a reinforced local audio signal.

11. The method of claim 7 wherein the second reference is a remote audio signal.

12. The method of claim 7 wherein the echo canceller comprises a first adaptive filter, a summation function, a state machine and suppression functionality.

13. The method of claim 12 wherein the feedback canceller comprises a second adaptive filter, the summation function, a state machine and the suppression functionality.

14. A conferencing system for processing a local audio signal comprising:
at least one microphone;
a loud speaker system connected to the at least one microphone; and
an echo canceller that receives a local audio signal from the microphone and operates in conjunction with a first reinforced local audio signal echo canceller reference and a second remote audio signal echo canceller reference to remove substantially all of an acoustic feedback from the local audio signal and that does not suppress the local audio signal when only the first reinforced local audio signal echo canceller reference is detected to be active.

15. The conferencing system of claim 14 wherein the conferencing system is one of a multimedia conferencing system, an audio conferencing system and a video conferencing system.

16. The conferencing system of claim 14 wherein the echo canceller is comprised of an adaptive filter, a summation function, a state machine and suppression functionality.

* * * * *